(12) United States Patent  (10) Patent No.: US 7,499,211 B2
Suwabe et al.  (45) Date of Patent: Mar. 3, 2009

(54) DISPLAY MEDIUM AND DISPLAY DEVICE

(75) Inventors: Yasufumi Suwabe, Kanagawa (JP);
 Satoshi Tatsuura, Kanagawa (JP);
 Yoshinori Machida, Kanagawa (JP);
 Masaaki Abe, Kanagawa (JP); Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/812,069

(22) Filed: Jun. 14, 2007

(65) Prior Publication Data

US 2008/0151355 A1  Jun. 26, 2008

(30) Foreign Application Priority Data

Dec. 26, 2006 (JP) ............................. 2006-349773
Feb. 1, 2007 (JP) ............................. 2007-023392

(51) Int. Cl.
 *G02B 26/00* (2006.01)
 *G02F 1/03* (2006.01)
(52) U.S. Cl. ........................................ 359/296; 359/245
(58) Field of Classification Search .................. 359/296
 See application file for complete search history.

(56) References Cited

U.S. PATENT DOCUMENTS

2005/0166958 A1* 8/2005 Park et al. .................... 136/263
2007/0188848 A1* 8/2007 Machida et al. ............. 359/296
2007/0206270 A1* 9/2007 Iwamatsu et al. ........... 359/296
2008/0112040 A1* 5/2008 Suwabe et al. .............. 359/296

FOREIGN PATENT DOCUMENTS

JP  B 50-15120  6/1975
JP  A 2003-186062  7/2003

* cited by examiner

*Primary Examiner*—Jordan M. Schwartz
*Assistant Examiner*—James C Jones
(74) *Attorney, Agent, or Firm*—Oliff & Berridge, PLC

(57) ABSTRACT

The present invention provides a display medium, comprising:
 a display medium, comprising:
  a pair of substrates, at least one of the pair of substrates having transparency;
  a particle group enclosed between the pair of substrates, the particle group migrating between the pair of substrates in response to an electric field formed between the pair of substrates;
  a dispersion medium that is enclosed between the pair of substrates and disperses the particle group;
  a porous member disposed between the pair of substrates and having a plurality of pores that allow passage of the particle group; and
  embedded members that partition the porous member into specific regions and that are embedded inside at least a part of the pores in the porous member that are present along the direction in which the pair of substrates are opposed.

18 Claims, 10 Drawing Sheets

DISPLAY MEDIUM AND DISPLAY DEVICE

CROSS-REFERENCE TO RELATED APPLICATIONS

This application is based on and claims priority under 35 USC 119 from Japanese Patent Applications Nos. 2006-349773 filed on Dec. 26, 2006 and 2007-023392 filed on Feb. 1, 2007.

BACKGROUND

1. Technical Field

The present invention relates to a display medium and a display device.

2. Related Art

Display media containing colored particles are known as rewritable image-displaying media.

Such a display medium is configured to have, for example, a pair of substrates, and particle group enclosed in the space between the pair of substrates that can migrate between the substrates according to an electric field formed between the substrates. The particle group enclosed in the space between the pair of substrates may be one kind of particle group in a particular color or a mixture of multiple kinds of particle groups different in color and having different electric field intensity necessary for the respective kinds of particle groups to migrate.

In such a display medium, an image in a color reflecting the amount and the color of the particles migrated to the side of one substrate is displayed while voltage is applied between the pair of substrates and the enclosed particles are forced to migrate thereby. Thus, an image in a desired color is displayed by applying a voltage at a strength that causes migration of the desired particle group between the substrates and, thus, displacing the desired particle group to the side of one of the pair of substrates according to the desired color of the image to be displayed.

SUMMARY

According to an aspect of the invention, there is provided a display medium, comprising:

a pair of substrates, at least one of the pair of substrates having transparency; a particle group enclosed between the pair of substrates, the particle group migrating between the pair of substrates in response to an electric field formed between the pair of substrates; a dispersion medium that is enclosed between the pair of substrates and disperses the particle group; a porous member disposed between the pair of substrates and having a plurality of pores that allow passage of the particle group; and embedded members that partition the porous member into specific regions and that are embedded inside at least a part of the pores in the porous member that are present along the direction in which the pair of substrates are opposed.

BRIEF DESCRIPTION OF THE DRAWINGS

Exemplary embodiments of the present invention will be described in detail based on the following figures, wherein.

DETAILED DESCRIPTION

First Embodiment

Hereinafter, the display device in an embodiment of the present embodiment will be described with reference to drawings.

Figure 1:
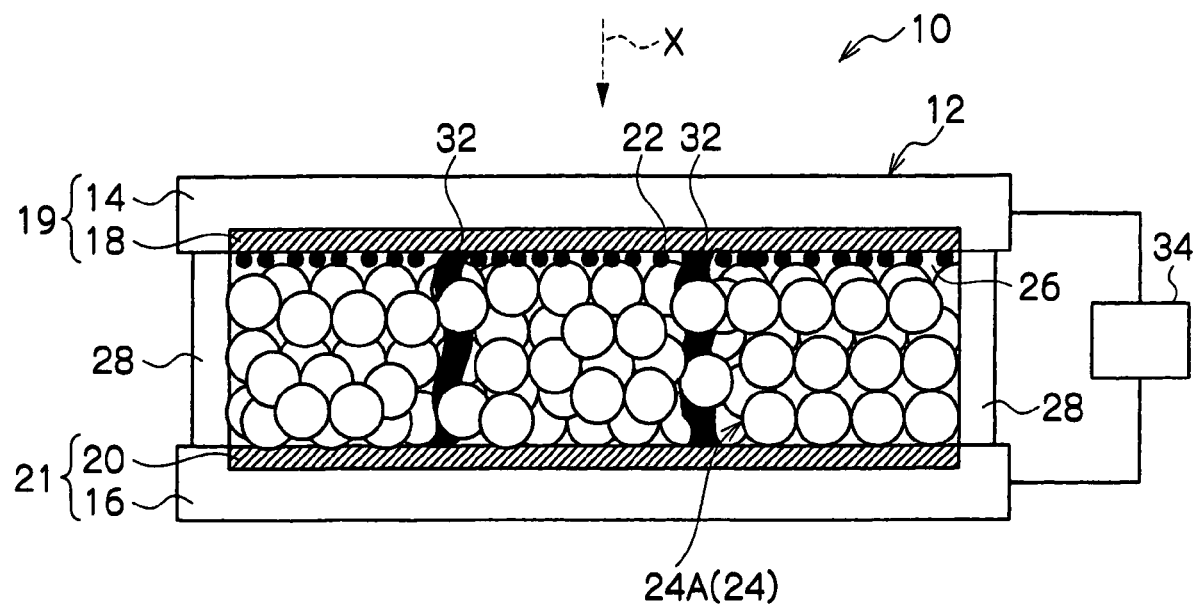
FIG. 1 is a schematic configuration view illustrating a display device in a first embodiment.

As shown in FIG. 1, the display device 10 in the embodiment of the invention includes a display medium 12 and an electric field-forming unit 34 forming an electric field in the display medium 12.

The display medium 12 includes a display substrate 19 as an image displaying side, a rear substrate 21 being disposed opposite to the display substrate 19 with a gap, gap members 28 for maintaining a predetermined gap between these substrates, and particle group 22.

The display substrate 19 has a supporting substrate 14 and a surface electrode 18 layered thereon. The rear substrate 21 has a supporting substrate 16 and a rear electrode 20 layered thereon. A dispersion medium 26 is enclosed in the gap between the display substrate 19 and the rear substrate 21. The particle group 22 are composed of plural particles that are dispersed in the dispersion medium 26 and migrate in the gap between the display substrate 19 and rear substrate 21 according to the strength of the electric field formed between the display substrate 19 and the rear substrate 21.

A porous member 24 having pores allowing passage of the plural particles constituting the particle group 22 is placed between the display substrate 19 and the rear substrate 21.

There are also embedded members 32 formed between the display substrate 19 and the rear substrate 21, for embedding at least part of the pores in a particular region of the porous member 24 in the direction of the display substrate 19 and the rear substrate 21 facing each other (see below for details).

The supporting substrate 14 or both the supporting substrates 14 and 16 have transparency. The term transparency in the present embodiment means a visible-light transmittance of 70% or more, preferably 90% or more.

Examples of the materials for the supporting substrates 14 and 16 include glass, plastic such as polycarbonate resin, acrylic resin, polyimide resin, polyester resin, epoxy resin, and polyether sulfone resin.

Examples of the materials for the surface electrode 18 and the rear electrode 20 include oxides of indium, tin, cadmium, and antimony; complex oxides such as ITO; metals such as gold, silver, copper, and nickel; and organic materials such as polypyrrole and polythiophene. These materials can be used as a single layer film, a mixture film, or a composite film and can be formed by vapor deposition, sputtering, coating or other appropriate methods. The thickness of a film formed by vapor deposition or sputtering is usually 100 to 2,000 Å. The rear electrode 20 and the surface electrode 18 can be formed into a desired pattern, for example matrix form or stripe form which allows passive matrix driving, by a conventionally known methods such as etching for conventional liquid crystal display elements or printed boards.

The display substrate 19 may have a surface electrode 18 embedded in the supporting substrate 14. Alternatively, the rear substrate 21 may have a rear electrode 20 embedded in the supporting substrate 16. In this case, because the material of the supporting substrates 14 and 16 may affect the electrical property, magnetic property or fluidity of the each particle of the particle group 22, it is properly selected in consideration of the composition of each particle of the particle group 22 used.

The rear electrode 20 and the surface electrode 18 may be separated from the display substrate 19 and the rear substrate 21, respectively, and disposed outside the display medium 12.

In the above described case, the electrodes (surface electrode 18 and rear electrode 20) are provided on both the display substrate 19 and the rear substrate 21, but an electrode may be provided on only one or the other substrate.

In the display medium 12 (see FIG. 1), the display substrate 19 and the rear substrate 21 may have a TFT (thin film transistor) in each pixel of a displayed image, in order to enable active matrix driving. The TFT's are preferably formed not on the display substrate but on the rear substrate 21, from the viewpoint of easiness of lamination of wiring and mounting components.

When the display medium 12 is driven by a passive matrix system, the configuration of the display device 10 including display medium 12, which will be described later, can be simplified. On the other hand, when the display medium 12 is driven by an active matrix system using TFTs, the display speed is faster than that achieved by passive matrix driving.

For simplicity of description, the present embodiment will be described with reference to a drawing focused on the regions where images in the same color and at the same density are formed where a particular image is displayed on the display medium 12.

When the surface electrode 18 and the rear electrode 20 are formed on the supporting substrates 14 and 16, respectively, it is preferred, as necessary, to form a surface layer as a dielectric film on the surface electrode 18 and the rear electrode 20, respectively, to prevent the surface electrode 18 and the rear electrode 20 from being damaged and to prevent electrical leakage between electrodes that may cause the coagulation of the particles of the particle group 22.

Examples of the materials of the surface layer include polycarbonate, polyester, polystyrene, polyimide, epoxy, polyisocyanate, polyamide, polyvinylalcohol, polybutadiene, polymethyl methacrylate, copolymerized nylon, ultraviolet-curable acrylic resins, fluorine resin, and so on.

The materials for the dielectric film other than the materials described above may include materials containing a charge-transporting substance therein.

Examples of the charge-transporting substances include hole-transporting materials such as hydrazone compounds, stilbene compounds, pyrazoline compounds, and arylamine compounds; and electron transporting substances such as fluorenone compounds, diphenoquinone derivatives, pyran compounds, and zinc oxide, and self-supporting resins having charge-transporting properties.

Specific examples thereof include polyvinyl carbazole, and polycarbonate obtained by the polymerization of a specific dihydroxyarylamine and bischloroformate as described in U.S. Pat. No. 4,806,443. Because the surface layer as a dielectric film, which may affect the electrostatic properties and fluidity of the particle group 22, it is selected properly in consideration of the composition of the particle group 22. The display substrate 19 constituting the display medium 12 should have transparency as described above, and thus, materials having transparency is preferably used among the above materials.

The gap member 28 for maintaining a gap between the display substrate 19 and the rear substrate 21 is formed in such a manner not to impair the transparency of the display substrate 19, and may be formed with a thermoplastic resin, a thermosetting resin, an electron radiation curing resin, a photocurable resin, a rubber, a metal, or the like.

The gap member 28 may be integrated with either the display substrate 19 or the rear substrate 21. In such a case, the manufacturing processes may include etching processing to etch the display substrate 19 or the rear substrate 21, laser processing, press molding processing using a premold die, or print processing.

In this case, the gap member 28 may be provided on either the display substrate 19 side or the rear substrate 21 side, or both of them.

The gap member 28 may be colored or colorless, however, is preferably achromatic color or transparent and colorless not to adversely affect the image which is displayed on the display medium 12. In that case, for example, transparent resins such as polystyrene, polyester, or acrylic can be used as the member.

The gap member 28 may be prepared with a material in the same manner as those for the embedded member 32 (see below for details).

The particle group 22 are composed of plural particles and migrate in the dispersion medium 26 when a voltage higher than a threshold voltage predetermined according to the particle group 22 is applied between the electrodes of the surface electrode 18 and the rear electrode 20 (i.e., between the substrates of the display substrate 19 and the rear substrate 21), and an electric field at a particular electric-field intensity or more is formed between the substrates of the display substrate 19 and the substrate of rear substrate 21.

Change in the color displayed on the display medium 12 is caused by migration of respective particles constituting the particle group 22 in the dispersion medium 26.

The particle group 22 has a voltage range necessary for migration of each particle of the particle group 22. Namely, the particle group 22 has a voltage range from a voltage needed for initiation of migration of the particles to a voltage at which display density is saturated and there is no change in display density even when the voltage and voltage application period are increased further from the initiation of migration.

The voltage described above refers to an inter-substrate voltage applied between the display substrate 19 and the rear substrate 21.

The display density when "the display density is saturated" is a density at which when a voltage is applied between the display substrate 19 and the rear substrate 21 and the voltage is altered gradually (the applied voltage being raised or lowered) in a direction that increases the measured density, while the color density of the display substrate 19 side of the display medium 12 is monitored with a reflection densitometer of optical density (OD) manufactured by X-rite Inc., the density change per unit voltage is saturated and density change does not occur in this state even when the voltage is raised and the voltage application period is elongated.

Thus, there is no change in the display density of the display medium 12, when a voltage beyond the above voltage range is applied between the substrates of the display substrate 19 and the rear substrate 21, while changes appear in the display density of the display medium 12, when a voltage within the above voltage range is applied between the display substrate 19 and the rear substrate 21.

The state in which "changes appear in the display density of the display medium 12" is a state in which there is a change in display density that is evaluated by visual observation when a voltage is applied between the surface electrode 18 and the rear electrode 20 of the display medium 12 and the voltage level is then raised continuously from 0 V. In addition, in the evaluation, the state in which there is a change in display density is a state in which the amount of the density change from the density before application of voltage application is 0.1 or more, when the density of the display substrate 19 is measured by using a densitometer (trade name: X-RITE 404A, manufactured by X-Rite Inc.).

In order to control the above described voltage range of the particle group 22, any one of the average electrostatic charge of each particle constituting the particle group 22, the flow resistance of each particle surface with respect to the dispersion medium, the average magnetic charge (intensity of magnetization), the particle size, the shape factor of the particles, or combinations thereof may be adjusted.

Specifically, the average electrostatic charge of each particle constituting the particle group 22 can be adjusted by controlling the kind and amount of the charge controlling agent added to the resin described above, the kind and amount of the polymer chain bound to the particle surface, the kind and amount of the external additive added to or embedded in the particle surface, the kind and amount of the surfactant, polymer chain, or coupling agent added to the particle surface, or the specific surface area of the particle (volume-average primary particle diameter or particle shape factor).

The average magnetic charge of each particle can be adjusted, specifically by using various methods of magnetizing particles.

For example, particles may be prepared by mixing a magnetic substance such as powdery magnetite with a resin or dispersing and polymerizing a magnetic substance and a monomer, as in preparation of conventional electrophotographic magnetic toners. Alternatively, particles may be prepared by depositing a magnetic substance on the micropores of porous particles. Yet alternatively, a method to coat a magnetic substance has known. For example, resin-wrapped magnetic substance particles are prepared by polymerization of a monomer from the active site on the magnetic substance surface or by depositing a dissolved resin on the magnetic substance surface. A light and transparent or colored organic magnetic substance may also be used as the magnetic substance. The average magnetic charge of the particles can be adjusted by controlling the kind and amount of the magnetic substance used.

The particle size is, specifically, adjusted when the particles are prepared. When the particles are prepared by polymerization, the particle size can be adjusted by appropriately adjusting the amount of the dispersant, dispersion conditions, heating conditions, and when the particles are prepared by mixing, grinding, and classifying, the particle size can be adjusted by appropriately adjusting the classification conditions or the like. When the constituents of the particles are prepared by milling with a ball mill, the size of steel balls used in the ball mill, the rotating time, the rotating speed and other conditions are appropriately adjusted. The method for the adjustment is not limited to those described above.

The shape factor of the particles is, specifically, for example, preferably adjusted by a method as described in JP-A No. 10-10775, wherein so-called suspension polymerization, in which a polymer is dissolved in a solvent, mixed with a colorant, and dispersed in an aqueous medium in the presence of an inorganic dispersant to obtain particles, is carried as follows: a monomer is added to a non-polymerizable organic solvent which is compatible with the monomer, and suspension-polymerized to obtain particles, and the particles are taken out and dried to remove the organic solvent. The drying method is preferably freeze drying, and the freeze drying is preferably carried out in a range of −10 to −200° C. more preferably −30° C. to −180° C. The freeze drying is carried out under a pressure of about 40 Pa or less, most preferably 13 Pa or less. The particle shape can be also controlled by the method as described in JP-A No. 2000-292971, wherein small particles are aggregated, unified, and enlarged to a desired particle size.

The particle group 22 may not have the favorable voltage range allowing migration of particles described above and may have a composition where the particle group 22 migrate at any voltage, but preferably have a voltage range such as described above, in order to increase the memory function of the display image and enable preservation of the image without power consumption.

Examples of the materials for each particle of the particle group 22 include glass beads, particles of metal oxide such as, alumina, and titanium oxide; thermoplastic or thermosetting resin particles; these resin particles holding a colorant on the surface; particles of a thermoplastic or thermosetting resin particles, these resin particles having colorants attached to the surface; metal colloid particles showing color due to the surface plasmon resonance; and the like, for example, the materials described in Japanese Patent Application No. 2006-36877 may be used. The method described in Japanese Patent Application No. 2006-376877 may also be used in production of each particle of the particle group 22.

The content of the particle group 22 with respect to the dispersion medium 26 (particles weight/(particles weight+ dispersion medium weight)×100) (wt %) is not particularly limited as long as a certain density is provided so that a desirable hue is obtained, and is adjusted according to the desirable thickness of the display medium 12 (i.e., the distance between the substrates of display substrate 19 and rear substrate 21). Thus for obtaining a desirable hue, the content of the particle group 22 is smaller when the thickness of the display medium 12 is larger, while the content of the particle group 22 is larger when the thickness of the display medium 12 is smaller, and it is usually 0.01 to 50 wt %.

The dispersion medium 26 in which the particle group 22 is dispersed is preferably a high-resistance liquid. The "high resistance" means a volume resistivity of $10^{10}$ Ω·cm or more, preferably $10^{12}$ Ω·cm or more.

Typical favorable examples of the high-resistance liquids for use include hexane, cyclohexane, toluene, xylene, decane, hexadecane, kerosene, paraffins, isoparaffins, silicone oils, dichloroethylene, trichloroethylene, perchloroethylene, high-purity petroleum, ethylene glycol, alcohols, ethers, esters, dimethylformamide, dimethylacetamide, dimethylsulfoxide, N-methylpyrrolidone, 2-pyrrolidone, N-methylformamide, acetonitrile, tetrahydrofuran, propylene carbonate, ethylene carbonate, benzin, diisopropylnaphthalene, olive oil, isopropanol, trichlorotrifluoroethane, tetrachloroethane, dibromotetrafluoroethane, and the like, and the mixtures thereof.

It is also possible to use water (so-called, pure water) as the dispersion medium 26 by removing the impurities therein to the volume resistance described below. The volume resistance is available $10^3$ Ωcm or more, preferably $10^{10}$ Ωcm or more, and more preferably $10^{12}$ Ωcm or more.

The high-resistance liquid may contain as needed additives such as acid, alkali, salt, dispersion stabilizer, stabilizer against oxidation or ultraviolet absorption, antibacterial agent and an antiseptic substance in amounts suitable for making the volume resistance in the favorable range above.

In addition, an anionic surfactant, cationic surfactant, amphoteric surfactant, nonionic surfactant, fluorochemical surfactant, silicone-based surfactant, metal soap, alkyl phosphate ester, succinimide, or the like may be added as a charge controlling agent to the high-resistance liquid.

Specific examples of the ionic and nonionic surfactants include nonionic surfactants such as polyoxyethylene nonylphenylether, polyoxyethylene octylphenylether, polyoxyethylene dodecylphenylether, polyoxyethylene alkylethers, polyoxyethylene fatty acid esters, sorbitan fatty acid esters, polyoxyethylene sorbitan fatty acid esters, fatty acid alkylol amides, and the like; anion surfactants such as alkylbenzenesulfonic acid salts, alkylphenylsulfonic acid salts, alkylnaphthalenesulfonic acid salts, higher fatty acid salts, higher fatty acid ester sulfate ester salts, higher fatty acid ester sulfonic acids, and the like; and cationic surfactants such as primary to tertiary amine salts, and quaternary ammonium salts. The charge controlling agent is preferably added in an amount in the range of 0.01 wt % or more, preferably 20 wt % or less, and particularly preferably 0.05 to 10 wt %, with respect to the particle solid matter. If the content is less than 0.01 wt %, satisfactory charge control effect cannot be achieved, and if exceeds 20 wt %, the conductivity of the developer is excessively increased.

The particle group 22 enclosed in the display medium 12 is also, preferably dispersed as a dispersion medium 26 in the polymer resin. The polymer resin is preferably a polymer gel, a network polymer, or the like.

Examples of the polymer resin include polymer gel derived from natural polymer, such as agarose, agaropectin, amylose, sodium alginate, propyleneglycol alginate ester, isolichenan, insulin, ethyl cellulose, ethylhydroxyethyl cellulose, curdlan, casein, carrageenan, carboxymethyl cellulose, carboxymethyl starch, callose, agar, chitin, chitosan, silk fibroin, Cyamoposis Gum, pyrus cydonia seed, crown gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pustulan, funoran, decomposed xyloglucan, pectin, porphyran, methyl cellulose, methyl starch, laminaran, lichenan, lenthinan, and locust bean gum; and synthetic polymer including nearly all kinds of polymer gels.

Another examples include polymers containing functional groups such as alcohol, ketone, ether, ester, and amide in the repeating units, such as, polyvinyl alcohol, poly(meth)acrylamide and derivatives thereof, polyvinyl pyrrolidone, polyethylene oxide and copolymers containing these polymers.

Among them, gelatin, polyvinyl alcohol, and poly(meth)acrylamide are preferably used from the viewpoints of production-stability and electrophoresis characteristics.

These polymer resins are preferably used as the dispersion medium 26 together with the high-resistance liquid above.

It is also possible to make the display medium 12 display a color different from that of the particle group 22, by mixing the following colorant in the dispersion medium 26. For example when the color of particle group 22 is black, it is possible to make the display medium 12 display white and black colors by adding a white colorant.

Examples of the white colorants to be mixed in the dispersion medium 26 include white pigment particles such as titanium oxide, magnesium oxide, and zinc oxide. An organic or inorganic pigment, an oil soluble dye, or the like may be used for displaying of a color other than white, and examples thereof include known colorants such as carbon black, phthalocyanine copper-based cyan colorants, azo based yellow colorants, azo based magenta colorants, quinacridone based magenta colorants, red colorants, green colorants, and blue colorants. Typical examples thereof include aniline blue, Calco Oil Blue, chromium yellow, ultramarine blue, Du Pont Oil Red, quinoline yellow, methylene blue chloride, phthalocyanine blue, malachite green oxalate, lamp black, rose bengal, C.I. Pigment Red 48:1, C.I, Pigment Red 122, C.I. Pigment Red 57:1, C.I. Pigment Yellow 97, C.I. Blue 15:1, C.I. Pigment Blue 15:3, and the like.

By adjusting the color of the dispersion medium 26 to be the same as that of the porous member 24 described below, it is possible to improve the display contrast by increase of the shielding efficiency (as seen from the display substrate 19 side) of the particle group 22 displaced to the rear substrate 21 side when the particle group 22 migrate from the porous member 24 to the rear substrate 21 side.

The porous member 24 is a member having pores allowing migration of each particle constituting the particle group 22, which allows migration through the pores of each particle constituting the particle group 22 from the display substrate 19 side to the rear substrate 21 side, from the rear substrate 21 side to the display substrate 19 side, or in a direction perpendicular to that in which the display substrate 19 and the rear substrate 21 are opposed. The porous member 24 has a color different from that of the particle group 22, so that the color of the particles is visible when the particles are present in the display substrate side of the porous member, while the color of the porous member is displayed when the particles are present in the rear substrate side of the display substrate, and thus, it is possible to make the display medium 12 display a color different from that of the particle group 22.

The thickness of the porous member 24 is preferably at least as thick as the volume average particle diameter of the particles constituting the particle group 22. The thickness of the porous member is more preferably about 3 layers (about 3 times larger than volume average particle diameter), because in some cases, the particle group on the rear face may be visible though the pore region of porous member otherwise. Thus, the particles constituting the particle group 22 migrate through the pores in the porous member 24A, enabling the display medium 12 to display sufficiently high density.

Examples of the materials for the porous member 24 include porous materials such as gelatin, porous silica, network-structured polymers such as polyacrylamide, fiber aggregate, and the like. Also included are aggregates of particles of a thermoplastic resin such as an acrylic or styrene resin.

Hereinafter when a porous member 24 is composed of a particle aggregate, it is referred to as porous member 24A (see FIG. 1), while when a porous member 24 is composed of a porous material, such as gelatin, porous silica, a network-structured polymer such as polyacrylamide, or a fiber aggregate, it is referred to as porous member 24B (see FIG. 2). The porous members 24A and 24B are generically called a porous member 24. Description of the display medium 13 having the porous member 24B, and the display device 11 having the display medium 13 shown in FIG. 2 will be omitted, because they have the same configurations, except that the porous member 24A is replaced with the porous member 24B.

When the porous member 24 is composed of a particle aggregate, particles of the porous member 24A are preferably arranged at least in the planar surface direction of the display substrate 19 in the space between the display substrate 19 and the rear substrate 21 of the porous member 24A as shown in FIG. 1; however, the particles of the porous member 24A are preferably filled in the entire space between the display substrate 19 and the rear substrate 21 to a density at which the particles of the porous member 24A cannot move, as shown in FIG. 1.

The average diameter of each particle of the porous member 24A is not particularly limited, but is preferably large enough that the particles constituting the particle group 22 can pass through the gaps between adjacent particles of the porous member 24A (corresponding to the pores of porous member 24A) when the particle aggregate is arranged in the space between the display substrate 19 and the rear substrate 21.

Thus, the average diameter of the particles constituting the porous member 24A is preferably ten times or more, and more preferably 25 times or more, larger than that of the particles constituting the particle group 22. When the average diameter of the particles constituting the porous member 24A is smaller than ten times larger than that of the particles constituting the particle group 22, the particles constituting the particle group 22 do not pass easily through between the particles constituting porous member 24A, and it may be difficult to change the displayed color density. The upper-limit of the average diameter of the particles constituting the porous member 24A is not particularly limited; however, it is preferably smaller than the distance between the display substrate 19 and the rear substrate 21.

For an example, when the average diameter of the particle group 22 is 0.01 µm to 1 µm, the average diameter of the particles constituting porous member 24A is preferably in the range of 1 µm to 20 µm.

Figure 2:
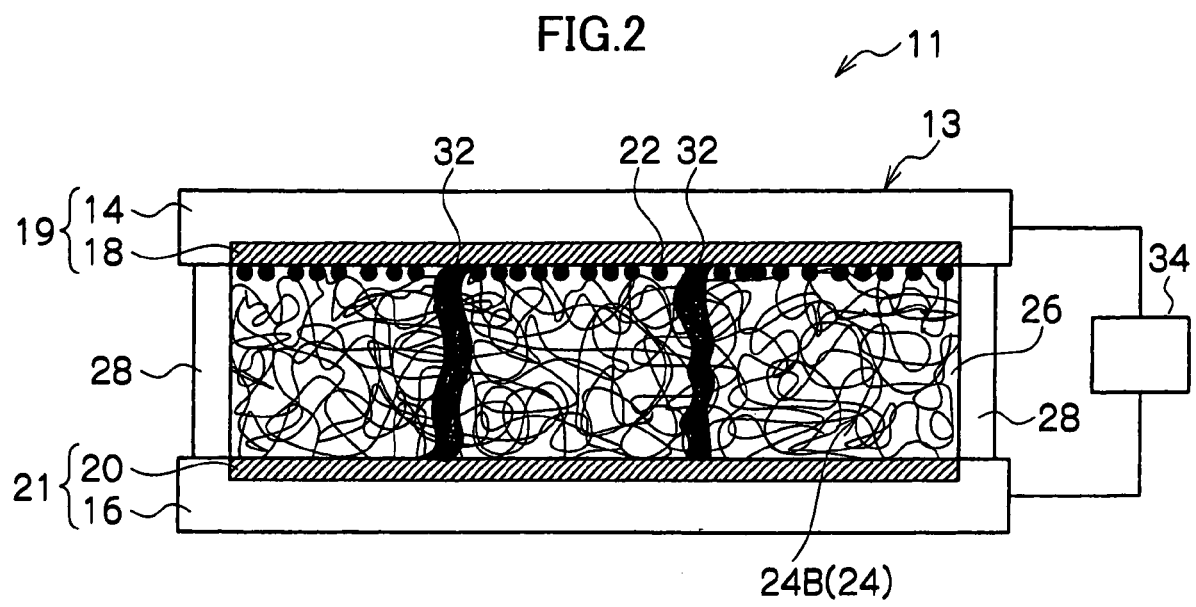
FIG. 2 is a schematic configuration view illustrating the display device in the first embodiment.

On the other hand, as shown in FIG. 2, the average pore size of the porous member 24B as a porous member 24 composed of a porous material such as gelatin, porous silica, a network-structured polymer such as polyacrylamide, fiber aggregate, or the like, is not particularly limited, if it is a size allowing migration of each particle constituting the particle group 22 when an electric field is applied between the display substrate 19 and the rear substrate 21; and specifically, it is preferably 5 times or more, more preferably 10 times or more larger than that of the particles constituting the particle group 22. When the average pore size of the porous-member 24B is less than 10 times larger than that of the particle group 22, the electrophoretic particles do not pass through pores in the porous member 24B composed of a porous material, a network structured polymer, or fiber aggregates, it may be difficult to switch display states.

Examples of the fiber-aggregates include bulky materials simply of mixture of fibers, those of fibers densely arranged, knitted fabrics of twisted yarn, nets, woven fabrics, non-woven fabrics in which at least part of the fibers are fused or entangled, web-shaped or sheet-shaped materials, and the like, and, for example, a nonwoven fabric is used.

The color of the porous member 24 is not particularly limited, if it is different from that of the particle group 22. In coloring the porous member 24, a known colorant, such as the one used in coloring the dispersion medium 26, is favorably added to the material for the porous member 24. Specifically, for example, a white colorant is held to the surface of the porous member 24, to make the color of porous member 24 white. Examples of the white colorants for use include white pigment such as titanium dioxide, barium titanate, barium sulfate, calcium carbonate, and the like.

The embedded member 32 is a member that is placed between the display substrate 19 and the rear substrate 21 and that partitions the porous member 24 into plural specific regions along the planar surface direction of the substrates, and is embedded inside at least part of the pores present in the porous member 24 along the direction in which the pair of substrates (display substrate 19 and rear substrate 21) are opposed to the extent that passage of the particle group 22 is difficult.

In the present embodiment and the second embodiment described below, the planar surface direction of a substrate means a surface direction of the display substrate 19.

Presence of the embedded member 32 in the display medium 12 restricts migration of each particle constituting the particle group 22 enclosed between the display substrate 19 and the rear substrate 21 in the display medium 12 in the direction crossing the embedded member 32. Thus, it is possible to restrict migration of each particle constituting the particle group 22 in the planar surface direction of the display substrate 19 and the rear substrate 21.

Figure 6A:
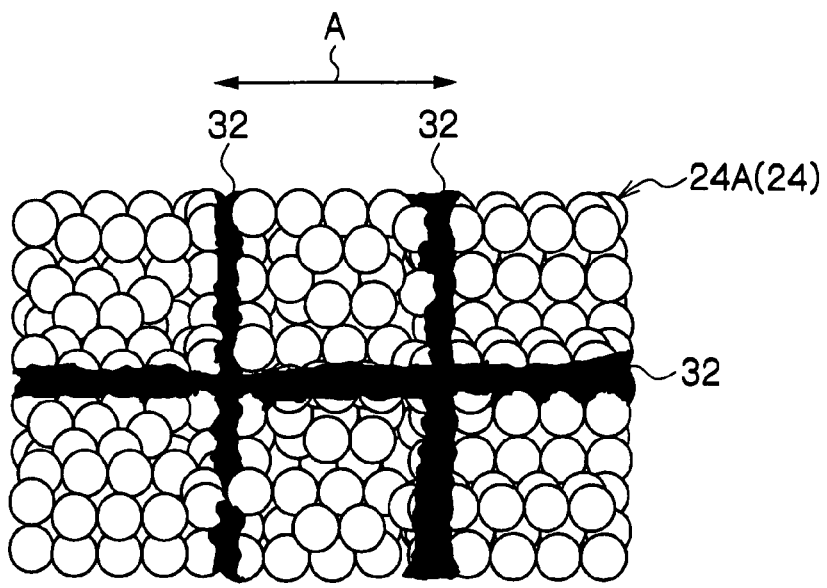
FIG. 6A is a schematic view illustrating the configuration of the embedded member on porous member in an embodiment.

FIG. 6A is a schematic view illustrating the porous member 24A and the embedded members 32 when the porous member 24 formed on the display medium 12 is seen from the display substrate 19 side (as seen in the direction indicated by arrow X in FIG. 1). As shown in FIG. 6A, the embedded members 32 are formed in such a manner that they form partitioned regions (particular regions) at a particular distance in the porous-member 24 between the display substrate 19 and the rear substrate 21 in the planar surface direction of the display substrate 19. The distance between the embedded members 32 in the planar surface direction may be constant or not.

The embedded members 32 are formed in the planar surface direction at an interval of 0.1 to 50 mm, for prevention of deterioration in visibility of the display medium 12.

For controlling the migration of the particle group 22 along the planar surface direction of display substrate 19, the embedded members 32 are preferably arranged densely in the planar surface direction in the range that does not impair the visibility of the display medium 12. The term "densely arranged" means specifically that the distance between neighboring embedded members 32 in the planar surface direction is in the range of 1 time or more and 1,000 times or less larger than the distance between the display substrate 19 and the rear substrate 21. A distance of 1,000 times or more larger leads to be difficult to restrict unevenness in density of the particle group 22 by migration of the particle group 22 in the planar surface direction by the embedded members 32, while a distance of not larger than 1 time possibly to deteriorate in visibility of the display medium 12 by the embedded member 32.

Figure 7:
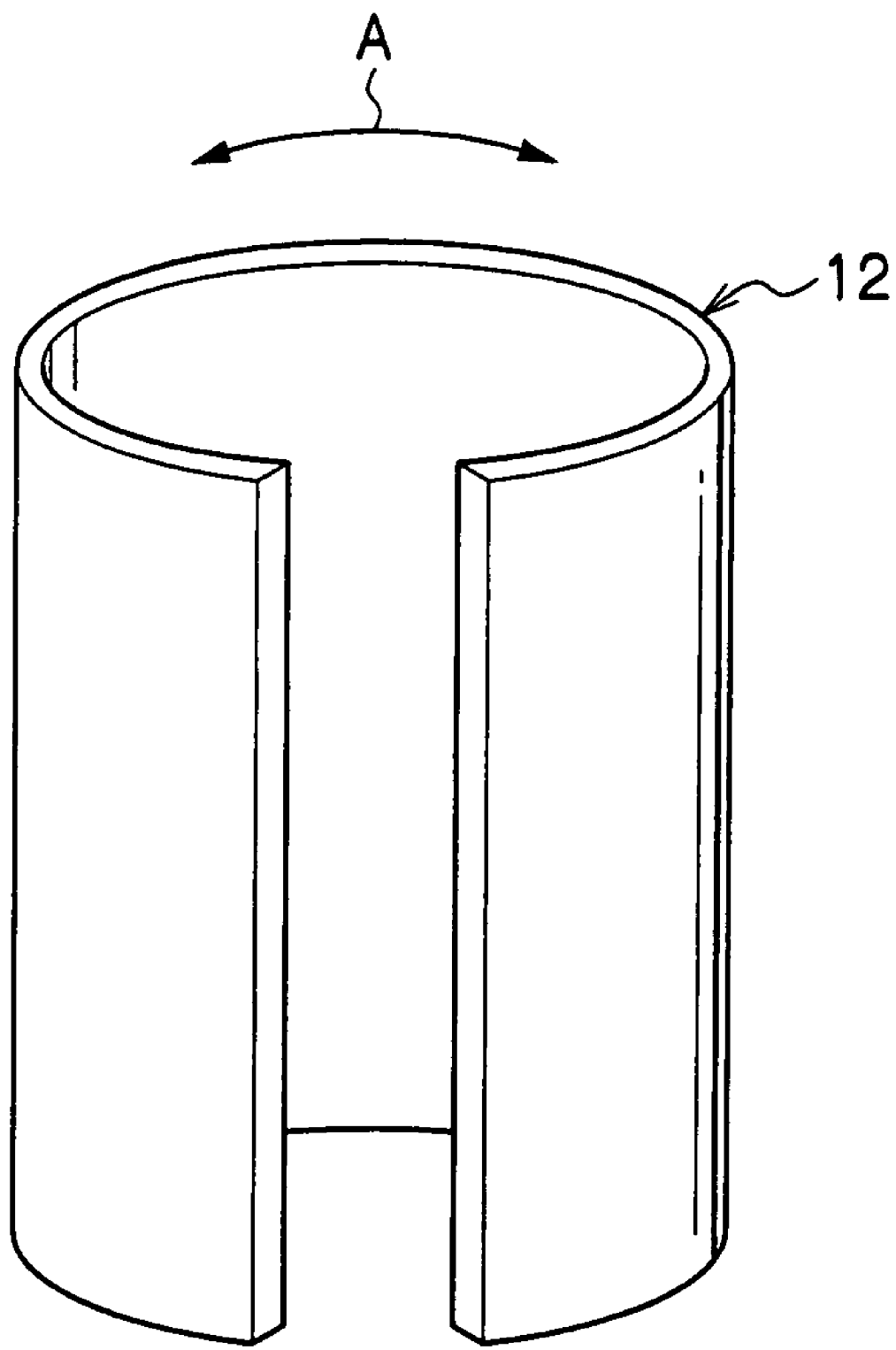
FIG. 7 is a schematic view illustrating the display medium in the first embodiment when it is bent.

Plural embedded members 32 are preferably formed along the direction of the display medium 12 being bent (for example, direction indicated by arrow A in FIG. 7 or 6A). Presence of the embedded members 32 in this way restrict migration of the particle group 22 in display medium 12 to the direction of the display medium 12 being bent.

Figure 6B:
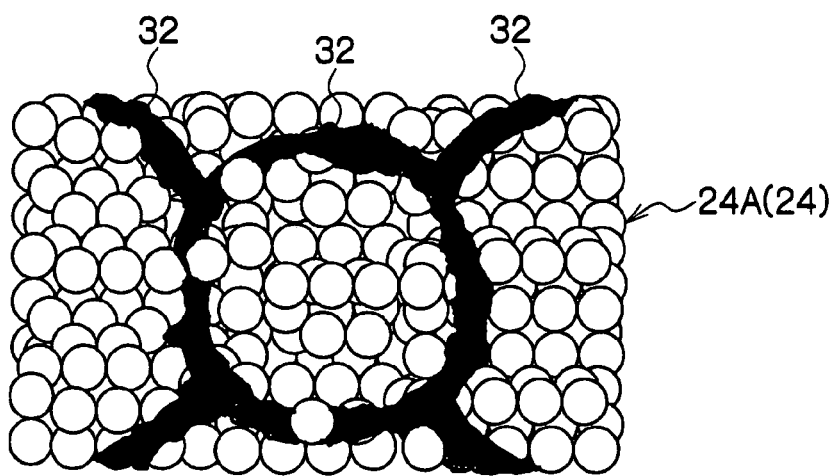
FIG. 6B is a schematic view illustrating the configuration of the embedded member on porous member in another embodiment.

The shape of the embedded member 32, as seen from the display substrate 19 side, is not limited and may be lattice (see FIG. 6A), circle (see FIG. 6B), wave, or the like.

Figure 6C:
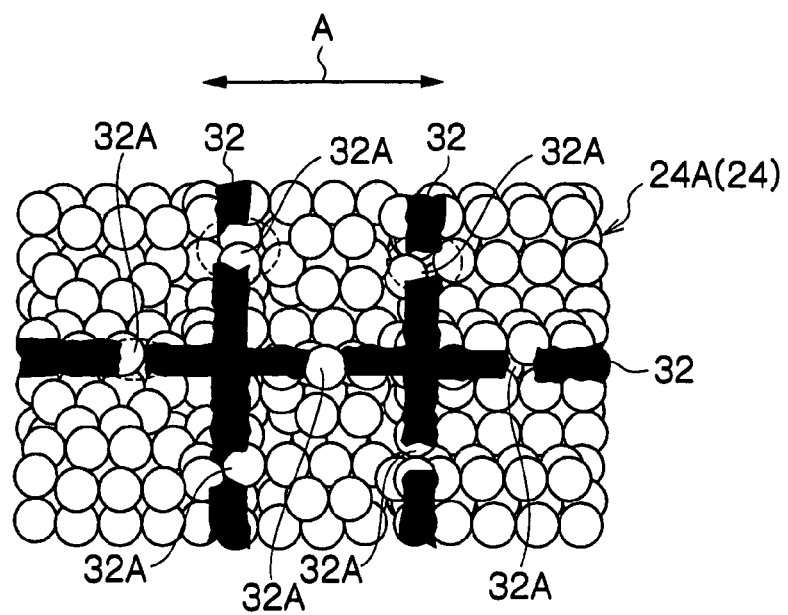
FIG. 6C is a schematic view illustrating the configuration of the embedded member on porous member in yet another embodiment.

As described above, the embedded members 32 are formed in such a manner that the porous member 24 placed between the substrates of the display substrate 19 and the rear substrate 21 is partitioned into plural particular regions formed along the planar surface direction of the display substrate 19 and the rear substrate 21; and, although embedded members 32 formed continuously in the planar surface direction is described above in the examples shown in FIGS. 6A and 6B, the embedded members 32 are preferably formed in such a manner that one or more discontinuous regions (hereinafter, referred to as "discontinuous regions") are formed planar surface direction, allowing at least part of the neighboring particular regions to connected to each other in the partitioned planar surface direction. For example as shown in FIG. 6C, the embedded members 32 preferably form one or more discontinuous regions 32A in the planar surface direction.

The discontinuous region 32A in embedded member 32 is preferably at least large enough that the particle group 22 in the display medium 12 can pass through. Specifically, the size of the discontinuous region 32A is preferably from 0.5 times to 20 times larger, and more preferably from equal size to 10 times larger, than the volume average diameter of particles constituting the particle group 22, when there is no stress applied to the display medium 12.

In the present embodiment, the "size of the discontinuous region 32A" means the minimum distance between the embedded members 32 opposed across the discontinuous region 32A, because the discontinuous region 32A is a discontinuous region of the embedded member 32.

The size of the discontinuous region 32A is preferably 0.5 times or more and 10 times or less, more preferably 1 time or more and 5 times or less, with respect to the gap between the display substrate 19 and the rear substrate 21, when the display medium 12 is bent with its either display substrate 19 or rear substrate 21 inside at a curvature radius of 30 mm.

As shown in FIG. 6C, if the embedded member 32 has discontinuous regions (discontinuous region 32A) in the planar surface direction, it is possible to avoid concentration of stress in a particular region of embedded member 32 and thus, restrict the damage of the embedded member 32, even when the display medium 12 is bent. For example, even when the display medium 12 is bent in the direction indicated by arrow A in FIG. 7, presence of a discontinuous region 32A restricts the stress concentration caused by bending in the particular region of the embedded member 32.

The discontinuous regions 32A of embedded member 32 are preferably formed at the same interval along the planar surface direction of the display substrate 19. Presence of the discontinuous regions 32A of embedded member 32 at the same interval in the planar surface direction of the display substrate 19 makes the stress applied to the embedded member 32, when the display medium 12 is bent, smaller than that when the discontinuous-regions 32A are not formed at the same interval, and thus, restricts damaging of the embedded member 32.

The gap members 28 described above for maintaining the gap between the display substrate 19 and the rear substrate 21 may be prepared with a material identical with that for the embedded member 32 by the same method, if it is in contact with the display substrate 19 at one end and with the rear substrate 21 at the other end, so as to maintain the gap between the display substrate 19 and the rear substrate 21. In this configuration, the gap member 28 and the embedded member 32 can be formed in a single step, allowing simplification of production steps, adjustment of the distance between the substrates (height of gap member 28 or thickness of embedded member 32), and adjustment of the distance between substrates uniformly along the entire substrate face.

If the gap member 28 and the embedded member 32 are prepared with different materials, the gap member 28 may be formed only the external boundary region outside of the display medium 12 between the display substrate 19 and the rear substrate 21 of display medium 12, while the embedded member 32 may be formed, similarly as described above inside the boundary region, i.e., the region of gap member 28, between the display substrate 19 and the rear substrate 21.

The embedded member 32 can be formed by fusing at least a partial region of the porous member 24 and closing the pores in the partial region of the porous member 24. The embedded member 32 may also be formed by inpouring a filler into the pores of a partial region of the porous member 24 so as to close the pores in the porous member 24, in the direction of the display substrate 19 and the rear substrate 21 facing each other.

When the embedded member 32 is formed as a region where at least a partial region of the porous member 24 is fused, it may be prepared by applying heat at a temperature of higher than the melting point of the material for the porous member 24 or supplying a solvent of the porous member 24 to the corresponding region of the gap member 28 in porous member 24 and thus, melting the porous member 24 in the region where heated or supplied the solvent.

As a method for supplying the filler from the surface of the porous member 24, a contact coating method such as screen coating, bar coating, roll coating, blade coating, screen coating, or tampo coating, or a non-contact coating method such as spray coating, spin coating, curtain coating, dip coating, or inkjet printing may be used.

The filler preferably has physical properties as high as a Young's modulus of 0.01 to 100 MPa and a Shore hardness of D10 to 100. A filler having a Young's modulus of less than 0.01 MPa may lead to breakage by the pressure of dispersion medium, while that of higher than 100 MPa may lead to lower compatibility with deformation of the display medium which may cause breaking and peeling thereof.

Examples of the fillers having the properties described above include thermosetting resins such as epoxy resins, acrylic resins, silicone resins, polyimide resins, poly-amide resins, polyolefin resins, urethane resins, polyvinyl resins, and waxes; ultraviolet-curable resins; and photosensitive resins; among them, epoxy resins, acrylic resins, and silicone resins are favorably used on the grounds that the resins have low solubility in the dispersant and have high mechanical strength after being cured.

For example, an embedded member 32 may be formed in porous member 24 by supplying acrylic resin as a filler as described above from the surface of the porous member 24 into a predetermined region for forming the embedded member 32 of the porous member 24, and subsequently drying or curing the acrylic resin by heat or ultraviolet ray.

The method of disposing the embedded member 32 is not limited thereto, and may include a method comprising coating a photosensitive resin on the entire surface of the porous member 24, followed by masking with a photomask having a specific pattern that masks regions other than the regions corresponding to regions for forming the embedded member 32, curing the photosensitive resin by exposing the porous member 24 through the masked region with an ultraviolet ray, subsequently etching the resin in the uncured region to form the embedded member 32. Alternatively, the embedded member 32 may be formed by a method comprising filling the porous member with an aqueous filler such as PVA resin by printing a specific pattern by inkjet printing on regions other than the regions corresponding to regions for forming the embedded member 32, filling by screen printing a thermosetting resin such as epoxy resin in portions where resin has not been formed, and obtaining a specified filler pattern by removing PVA resin with solvent.

As shown in FIGS. 1 and 2, the embedded member 32 may be formed in the region between the display substrate 1 and the rear substrate 21 in such a manner so as to contact with the display substrate 19 side at one end and with the rear substrate 21 side at the other end, however, the configuration is not limited thereto, if at least part of the pores in a specific region of the porous member 24 are enclosed in the direction of the display substrate 19 and the rear substrate 21 facing each other. In addition, the embedded member may not form a completely closed region, when seen in the direction from a plane parallel with the substrate face, if part of it is embedded in the direction between the display substrate 19 and the rear substrate 21. That means, even when the space between the substrates of the substrate 19 and the rear substrate 21 are not partitioned into a completely closed cell structure by the embedded member 32, the embedded member 32 may restrict particle group 22 from migration or localization caused by bending.

Figure 3:
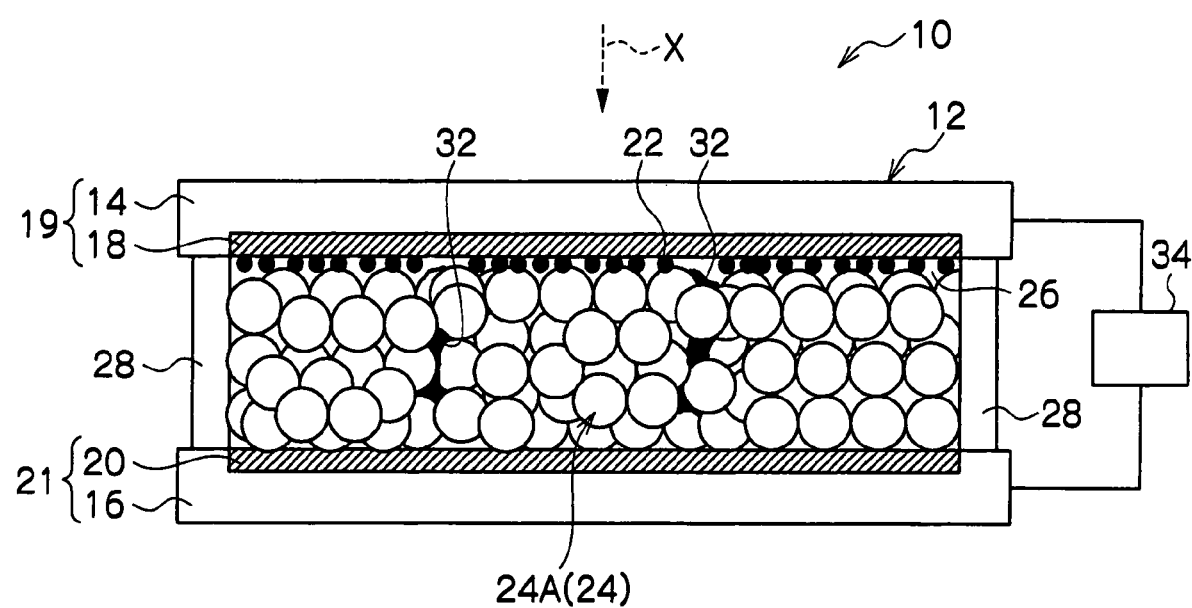
FIG. 3 is a schematic configuration view illustrating the display device in the first embodiment.

For example, neither ends of the embedded member 32 may be in contact with the display substrate 19 or the rear substrate 21, or any one of the ends may be in contact with the display substrate 19 or the rear substrate 21, as shown in FIG. 3.

Figure 4:
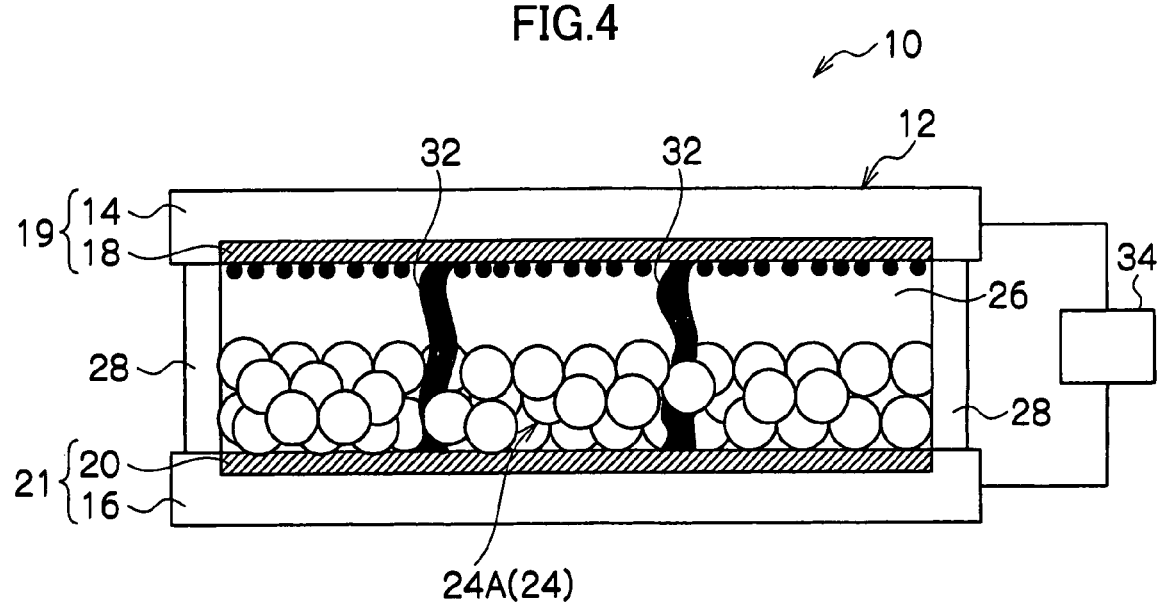
FIG. 4 is a schematic configuration view illustrating the display device in the first embodiment.
Figure 5:
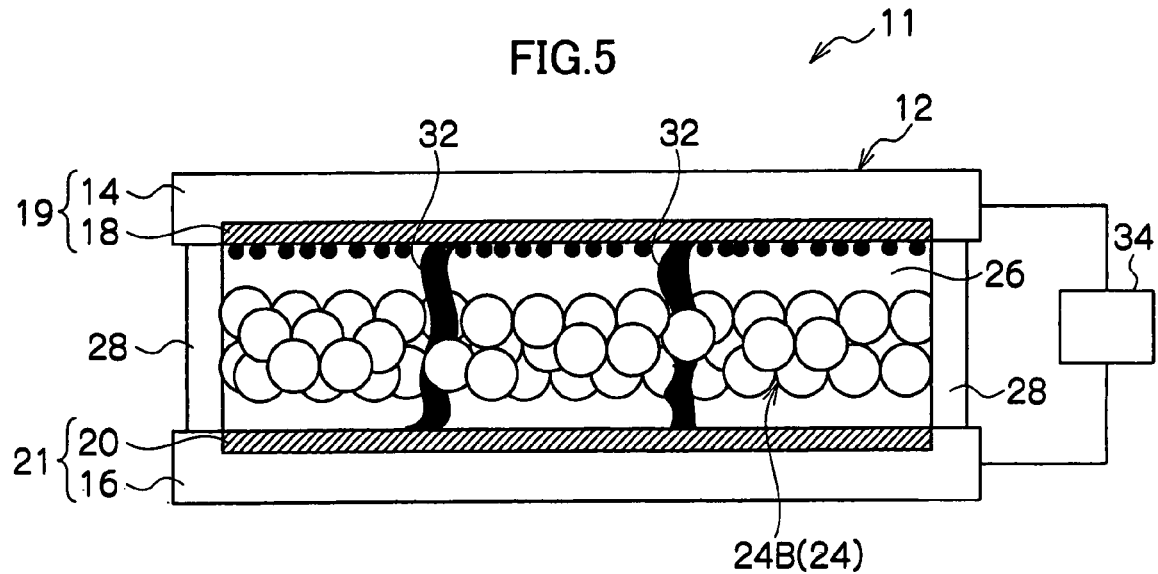
FIG. 5 is a schematic configuration view illustrating the display device in the first embodiment.

When the porous member 24 is unevenly distributed in the display substrate 19 side or the rear substrate 21 side (see FIG. 4) or in the region close to the center between the display substrate 19 and the rear substrate 21 (see FIG. 5), the embedded member 32 may be formed in such a manner that it fills the pores in the partial region of the porous member 24 in the direction of the display substrate 19 and the rear substrate 21 facing each other and is in contact with the display substrate 19 at one end and with the rear substrate 21 at the other end, as shown in FIGS. 4 and 5.

By forming the embedded member 32 as described above, the pores in the specific region of the porous member 24 are filled so that the particle group 22 have difficulty in passing through, such that the particles constituting the particle group 22 are prevented from moving along the planar surface direction of display substrate 19 by the embedded member 32, which enables suppression of migration particle group 22 in the planar surface direction of display substrate 19.

Since the embedded member 32 is provided so as to fill the pores in the porous member 24, it is possible to prevent from generating a void between the embedded member 32 and the porous member 24 when the display medium 12 is bent or when an external force is applied to the display substrate 19, and also to prevent displacement of the porous member 24 itself in the planar surface direction between the display substrate 19 and the rear substrate 21, compare to the case when migration of the particle group 22 in the planar surface direction of the display substrate 19 is controlled by forming alternate members for partitioning the space between the display substrate 19 and the rear substrate 21 and placing the porous members 24 between the members.

Hereinafter, the method of producing the display medium 12 will be described. Here, the method of producing the display medium 13 will be described below.

Figure 8A:
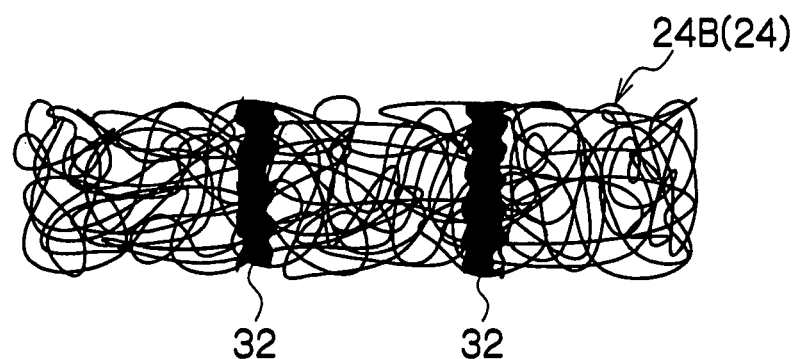
FIG. 8A is a schematic view illustrating a step of forming a display medium.

The method of producing the display medium 13 is not particularly limited, and may be formed, for example, by the following steps. As shown in FIG. 8A, a porous member 24B of, for example, nonwoven fabric is prepared as the porous member 24, and embedded members 32 as described above are formed in the porous member 24B. As described above, the embedded members 32 may be formed, for example, by a method of fusing the porous member 24B in the corresponding region for forming the embedded member 32 by heat or with solvent or by a method of infiltrating a filler into the pores in the corresponding region.

Figure 8B:
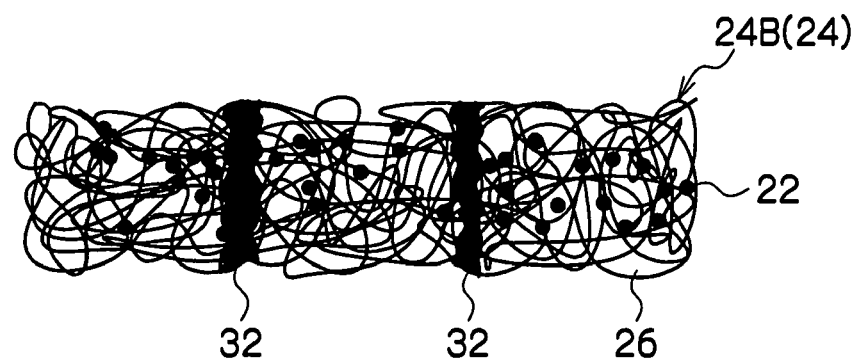
FIG. 8B is a schematic view illustrating another step of forming a display medium.
Figure 8C:
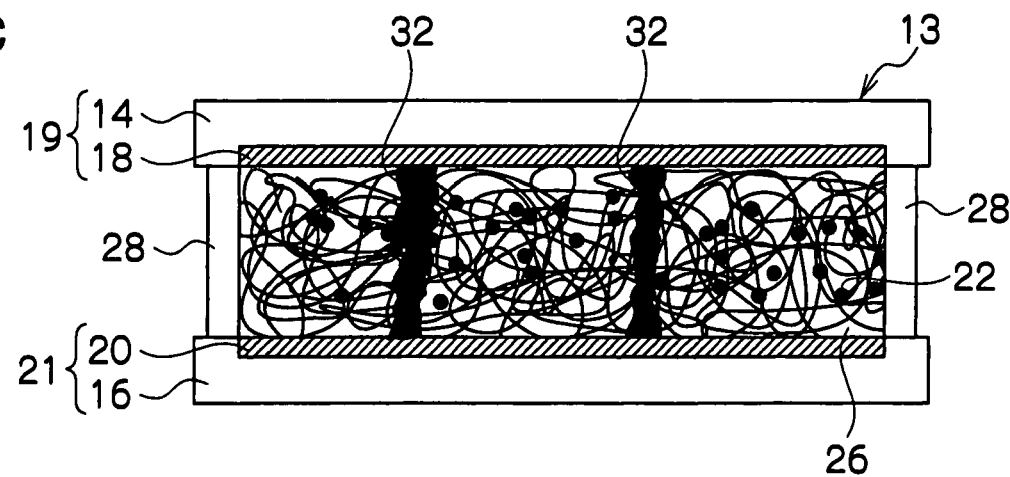
FIG. 8C is a schematic view illustrating yet another step of forming a display medium.

Then, particle group 22 and a dispersion medium 26 are supplied to the porous member 24B having the embedded members 32 formed therein, using a dispenser (see FIG. 8B). In addition, the porous member 24B containing the particle group 22 and the dispersion medium 26 and having the embedded members 32 formed therein is sandwiched between the display substrate 19 and the rear substrate 21 having gap members 28 formed thereat, and subsequently the gap members 28 and the display substrate 19 are bonded together to produce a display medium 12 (see FIG. 8C).

The display medium 13 may be prepared by a method of layering a porous member 24B on the rear substrate 21.

Figure 9A:
FIG. 9A is a schematic view illustrating a step of forming a display medium.
Figure 9B:
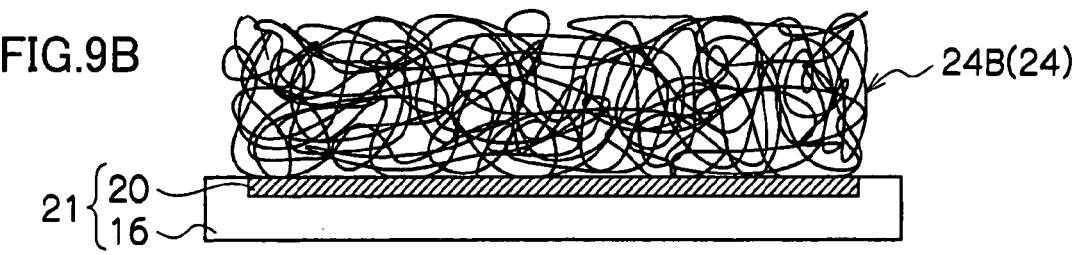
FIG. 9B is a schematic view illustrating another step of forming a display medium.
Figure 9C:
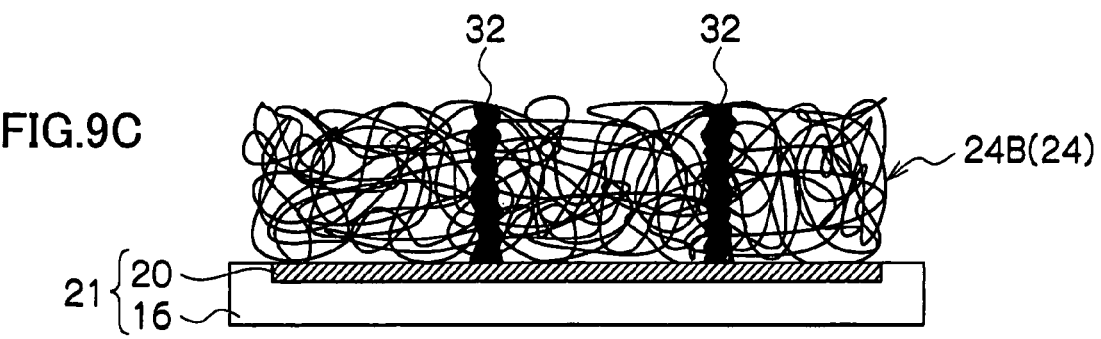
FIG. 9C is a schematic view illustrating yet another step of forming a display medium.
Figure 9D:
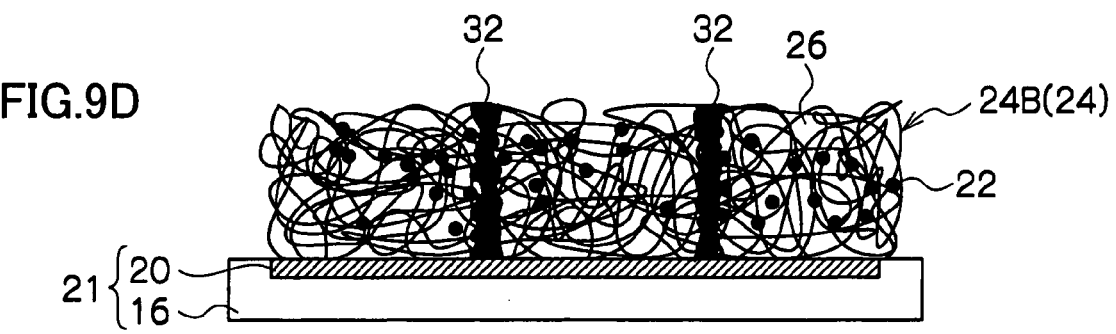
FIG. 9D is a schematic view illustrating yet another step of forming a display medium.
Figure 9E:
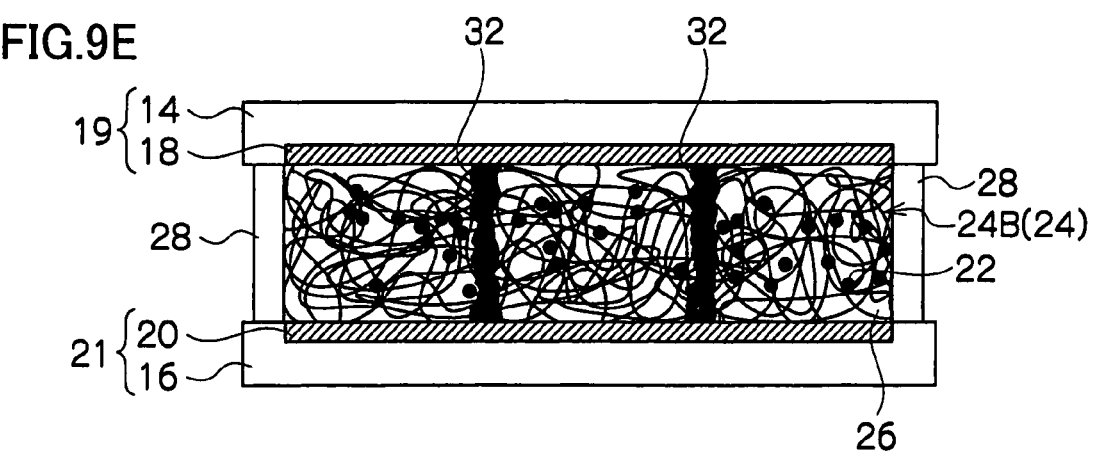
FIG. 9E is a schematic view illustrating yet another step of forming a display medium.

For example, as shown in FIG. 9A, a rear substrate 21 is prepared and the porous member 24B is layered on the rear substrate 21 (see FIG. 9B). Then, after embedded members 32 are formed in the porous member 24B in the same way as described above (see FIG. 9C), particle group 22 and a dispersion medium 26 are supplied to the space between neighboring embedded members 32 (see FIG. 9D). Then, gap members 28 are formed at end portions in the planar surface direction of the rear substrate 21; a display substrate 19 is formed thereon; and the gap members 28 and the display substrate 19 are bonded together to give a display medium 13 (see FIG. 9E).

A display medium 13 can be prepared by such a production method, more easily than by conventional methods.

The display media 12 and 13 in the configurations above can be used in various applications allowing data storage and rewriting such as bulletin board, notice circulation board, electronic blackboard, advertisement, signboard, flashing sings and marks, electronic paper, electronic newspaper, electronic book, and document sheet compatible with copying machine and printer.

Hereinafter, the display device 10 in the present embodiment will be described.

As described above, the display device 10 in the present embodiment is composed including a display medium 12 and an electric field-forming unit 34 applying voltage to the display medium 12 (see FIG. 1).

The display device 11 using the display medium 13 instead of the display medium 12 is the same as the display device 10, and thus, detailed description thereof is omitted.

The display media 12 and 13 correspond to the display medium of the display device according to the invention; and the display devices 10 and 11 correspond to the display device according to the invention; and the electric field-forming unit 34 corresponds to the electric field-forming unit of the display device according to the invention.

The dispersion medium 26 corresponds to the dispersion medium of the display medium according to the invention; the display substrate 19 and the rear substrate 21 correspond to the pair of substrates of the display medium according to the invention; and the porous member 24 corresponds to the porous member of the display medium according to the invention. The embedded member 32 corresponds to the embedded member of the display medium 12 according to the invention.

The electric field-forming unit 34 is electrically connected to the surface electrode 18 and the rear electrode 20. In a case where both the surface electrode 18 and the rear electrode 20 are electrically connected to the electric field-forming unit 34 will be described in the present embodiment, however, the configuration such that one of the surface electrode 18 and the rear electrode 20 is grounded and the other is configured to be in contact with the electric field-forming unit 34 may be used.

A voltage having an opposite polarity to the charging polarity of the particle group 22 is applied from the electric field-forming unit 34 to the surface electrode 18, for migration of the particle group 22 to the display substrate 19 side, and a voltage having the same polarity as the charging polarity of the particle group 22 is applied to the rear electrode 20 leads to migration of the particle group 22 to the display substrate 19 side where the surface electrode 18 is formed, as shown in FIG. 1. The color of the particle group 22 delivered to the display substrate 19 side is recognized visually as the color of the display medium 12.

Figure 10:
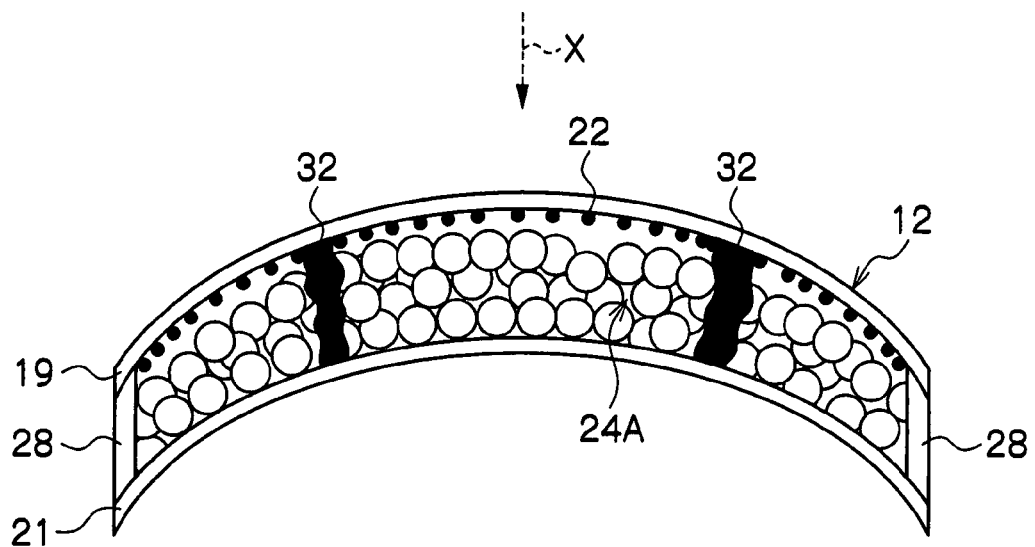
FIG. 10 is a schematic view illustrating the display medium in an embodiment when it is bent.

For example when the display medium 12 is bent in the planar surface direction of the display substrate 19 shown in FIG. 10 in the state described above, the particle group 22 reached to the display substrate 19 side may migrate in the planar surface direction, i.e., in the bending direction, along with bending of the display medium 12 in the planar surface direction of the display substrate 19, however, in the display medium 12 of the present embodiment, which has the embedded members 32 formed, the migration of the particle group 22 in the planar surface direction is suppressed by the embedded members 32. Accordingly, migration of the particle group 22 in the planar surface direction between the display substrate 19 and the rear substrate 21 is suppressed, even when the display medium 12 is bent in the planar surface direction of the display substrate 19 or when a force is applied to the display substrate 19 of the display medium 12.

Figure 11:
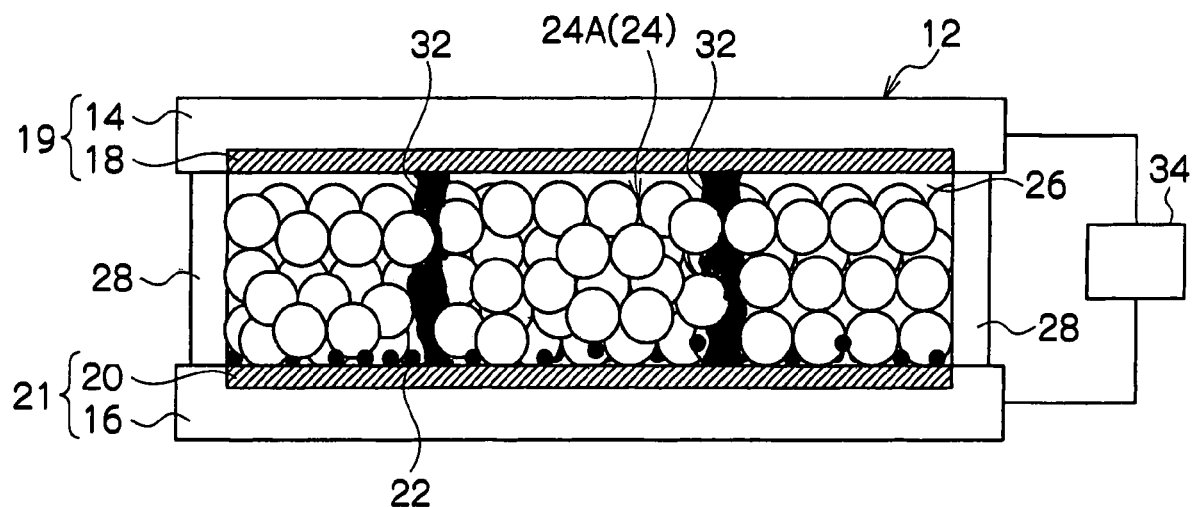
FIG. 11 is a schematic configuration view illustrating the display device in a first embodiment.

On the other hand, when a voltage having the same polarity as the charging polarity of the particle group 22 is applied from the electric field-forming unit 34 to the surface electrode 18 for migration of the particle group 22 to the rear substrate 21 side and a voltage having an opposite polarity to the charging polarity of the particle group 22 is applied to the rear electrode 20, the particle group 22 migrates from the side of the display substrate 19 provided surface electrode 18 to the side of the rear substrate 21 provided rear electrode 20, as shown in FIG. 11. The color of porous member 24 is recognized visually as the color of the display medium 12 when the porous member 24 is colored, while the color of the dispersion medium 26 is recognized visually as the color of the display medium 12 when the porous member 24 is transparent and the dispersion medium 26 is colored.

For example, even when the display medium 12 is bent in the planar surface direction of the display substrate 19 in the state described above, the display medium 12 of the present embodiment, which has the embedded members 32 formed, suppresses migration of the particle group 22 in the planar surface direction by the embedded members 32. Accordingly, migration of the particle group 22 in the planar surface direction between the display substrate 19 and the rear substrate 21 is suppressed, even when the display medium 12 is bent in the planar surface direction of the display substrate 19 or when a force is applied to the display substrate 19 of display medium 12.

Second Embodiment

In the first embodiment, a case was described in which the display medium 12 contains embedded members 32 that partition a porous member 24 disposed between the display substrate 19 and the rear substrate 21 into plural specific regions along the planar surface direction of the substrates, and that fill in at least a part of the pores present in the porous member 24 in the direction in which the display substrate 19 and the rear substrate 21 face each other to an extent that makes it difficult for the particle group 22 to pass through it.

Figure 12:
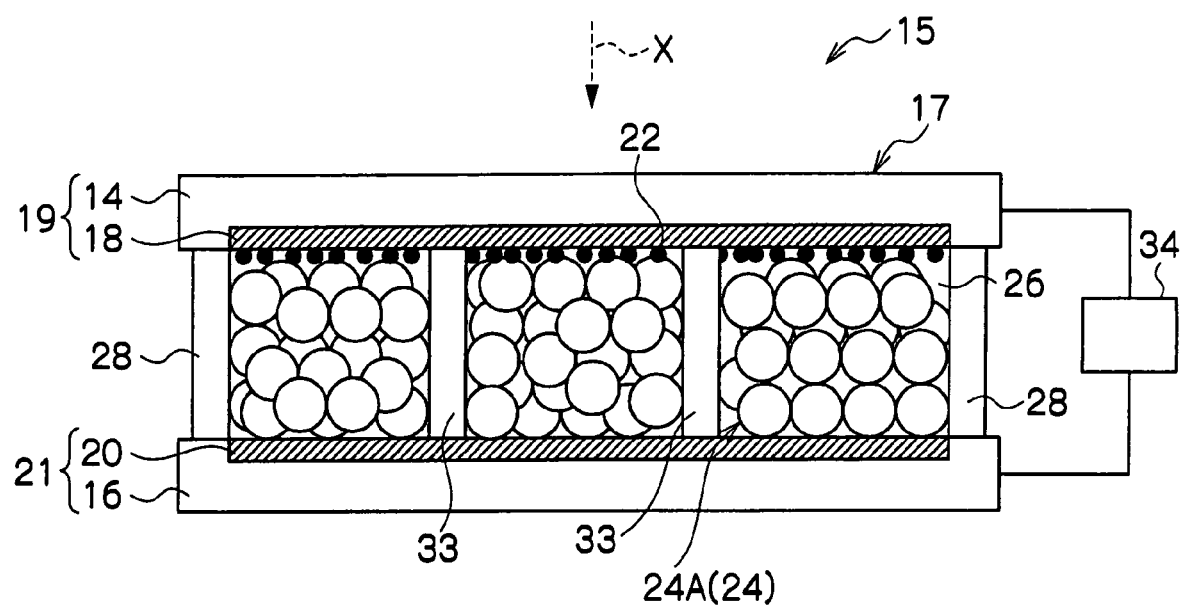
FIG. 12 is a schematic configuration view illustrating the display device in a second embodiment.

In the present embodiment, a case is described in which a display medium has partitioning members 33 instead of the embedded members 32, that maintain the gap between the display substrate 19 and the rear substrate 21 that partition the space between the substrates into plural particular regions along the planar surface direction, and that have discontinuous regions in the planar surface direction so that at least part of adjacent specific regions in the planar surface direction are connected (see FIG. 12 below).

In the present embodiment, the display medium 17 to be described (see FIG. 12, details described below) and the display media 12 and 13 described in the first embodiment are the same as each other except that the embedded members 32 described above are replaced with the partitioning members 33, and thus, the same codes are allocated to the same regions and detailed description thereof is eliminated.

The display device 15 in the present embodiment (see FIG. 12, details described below) is the same in configuration as the display device 10 described in the first embodiment except that the display medium 12 is replaced with the display medium 17, and thus, detailed description and description of the function thereof are eliminated.

As shown in FIG. 12, the display 15 device in the present embodiment contains a display medium 17 and an electric field-forming unit 34 for forming an electric field in the display medium 17. The display medium 17 includes a display substrate 19 as an image display surface, a rear substrate 21 being disposed opposite to the display substrate 19 with a gap, gap members 28 for maintaining the prescribed distance between these substrates, and particle group 22.

The display substrate 19 has a supporting substrate 14 and a surface electrode 18 layered thereon. The rear substrate 21 has a supporting substrate 16 and a rear electrode 20 layered thereon. A dispersion medium 26 is enclosed between the display substrate 19 and the rear substrate 21. The plural particles constituting the particle group 22 are dispersed in the dispersion medium 26, and migrate between the display substrate 19 and the rear substrate 21 according to the electric field intensity formed between the display substrate 19 and the rear substrate 21. The porous members 24 containing pores allowing passage of each particle constituting the particle group 22 are formed in the space between the display substrate 19 and the rear substrate 21.

The partitioning members 33 are provided between the display substrate 19 and the rear substrate 21, for partitioning the region between the display substrate 19 and the rear substrate 21 into plural regions along the planar surface direction of the substrates.

The partitioning member 33 is a member maintaining the gap between the display substrate 19 and the rear substrate 21 and partitioning the space between the substrates into specific regions, and having discontinuous regions 33A (hereinafter, referred to as "discontinuous regions") in the planar surface direction so that at least part of the adjacent particular regions in the planar surface direction is connected.

The size of the discontinuous region 33A is preferably 0.5 times or more and 20 times or less, more preferably 1 time or more and 10 times or less, larger than the volume average diameter of the particles constituting the particle group 22, when there is no stress applied to the display medium 17.

In the present embodiment, the "size of the discontinuous region 33A" means the minimum distance between the partitioning members 33 facing each other via the discontinuous region 33A, because the discontinuous region 33A is a discontinuous region of the partitioning member 33.

The size of the discontinuous region 33A is preferably from 0.5 times to 10 times, more preferably from equal size to 5 times, larger than the distance between the display substrate 19 and the rear substrate 21 when the display medium 17 is bent with either the display substrate 19 or rear substrate 21 at an inner side with a curvature radius of 30 mm.

As described above, the configuration of the partitioning members 33 that maintain the gap between the display substrate 19 and the rear substrate 21 such that the discontinuous region 33A in the planar surface direction restricts migration of respective particles constituting the particle group 22 in the planar surface direction when the display medium 13 is bent in the planar surface direction, also restricts concentration of the stress due to bending at a specific region of the partitioning member 33, due to the presence of the discontinuous regions 33A.

Thus, it is possible to prevent breakage of the partitioning member 33 and peeling thereof from the display substrate 19 or the rear substrate 21 and also to suppress the migration of the particles constituting the particle group 22 in the planar surface direction by the partitioning members 33.

The partitioning member 33 has a function to maintain the gap between the display substrate 19 and the rear substrate 21, and being provided so that one end is continuously connected to the display substrate 19 side and the other end is continuously connected to the rear substrate 21, thus, prevents the gap between the display substrate 19 and the rear substrate 21 from being narrowed by bending of the display medium 13.

The partitioning member 33 may be prepared with the same material as that for the embedded member 32 described in the first embodiment or with the following material.

The material used for the embedded member 32 may be used as the material for the partitioning member 33, and other materials such as a photosensitive resin allowing patterning by UV light, a thermoplastic resin such as hot-melt material, thermoplastic resin used for injection-molding, or a two-liquid curable resin may also be used.

In addition, the partitioning member 33 may be disposed similarly to the embedded member 32, for example, by a method of fusing at least part of the porous member 24 or a method of supplying a filler from the surface of the porous member 24, alternatively, may be disposed by a method different from those for the embedded member 32.

Specific examples of the methods include photolithographic method, three-dimensional photomolding method, nano-imprinting method, methods forming a desirable shape by injection compression molding, embossing, or heat pressing, and the like.

The display medium 17 in the configuration described above may be used, similarly to the display media 12 and 13 described in the first embodiment, in various applications allowing data storage and rewriting such as bulletin board, notice circulation board, electronic blackboard, advertisement, signboard, flashing sings and marks, electronic paper, electronic newspaper, electronic book, and document sheet compatible with copying machine and printer.

Hereinafter, the method of producing the display medium 17 in the present embodiment will be described. The display medium 17 may be prepared by the method of producing a display medium described in the first embodiment or by the following method.

For example, gap members 28 are disposed along the edge of a rear substrate 21, and partitioning members 33 are disposed onto the rear substrate 21. Then, porous member 24 is filled into the particular regions partitioned by partitioning members 33 on the rear substrate 21, and particle group 22 and a dispersion medium 26 are supplied therein. A display medium 17 is then prepared by holding the rear substrate 21 and a display substrate 19 via gap members 28 and partitioning members 33.

EXAMPLES

<Examples>

The following tests are performed to confirm the mechanism of the second embodiment.

Example 1

<Preparation of Particle Group 22>

PMMA (polymethylmethacrylate) resin particles containing dispersed black carbon prepared by suspension polymerization are used as particles constituting the particle group 22. The volume-average primary-particle diameter of the electrophoretic particles is 0.2 μm.

<Preparation of Porous Member 24A>

The following particles are prepared and used as the particles constituting the porous member 24A. First, cyclohexyl methacrylate: 53 parts by weight, titanium oxide (trade name: TIPAQUE CR63, manufactured by Ishihara Sangyo Kaisha Ltd.): 45 parts by weight, and cyclohexane: 5 parts by weight are pulverized in a ball mill by using zirconia balls having a diameter of 10 mm for 20 hours, to give a dispersion liquid A. Then, calcium carbonate: 40 parts by weight and water: 60 parts by weight are pulverized in the ball mill, to give a calcium carbonate dispersion B.

In addition, 2% aqueous serogen solution: 4.3 g, the above calcium carbonate dispersion liquid B: 8.5 g, and 20% sodium chloride water: 50 g are mixed, deaerated in an ultrasonic machine for 10 minutes, and stirred in an emulsion machine, to give a mixed solution C.

The dispersion liquid A prepared above: 35 g, divinylbenzene: 1 g, polymerization initiator AIBN: 0.35 g are mixed thoroughly and deaerated in an ultrasonic machine for 10 minutes. The mixture is added to the mixed solution C, and the mixture is emulsified in an emulsion machine. Then, the emulsion is poured in a bottle and sealed with a silicon stopple, and the bottle is deaerated under reduced pressure sufficiently using an injection needle and then filled with nitrogen gas.

The mixture is then allowed to react at 60° C. for 10 hours, to give particles. The dispersion is then cooled to 20° C., and cyclohexane is removed in a freeze drier at −35° C. and 0.1 Pa for 2 days. The particle powder thus obtained is dispersed in ion-exchange water; calcium carbonate is decomposed with aqueous hydrochloric acid; and the dispersion was filtered. The particles are washed thoroughly with distilled water; the particle size is adjusted; and the particles are dried. The color of the particles is white, and the volume-average primary particle diameter thereof is 12 μm.

<Dispersion Medium 26>

A silicone oil is used as the dispersion medium 26 in the present Example. The viscosity of the dispersion medium is 2 cS.

<Display Medium>

The display medium 17 shown in FIG. 12 is prepared according to the procedure shown below.

First, an ITO film (resistance: 200%) is formed on the surface of a PES film of 150 mm×110 mm (thickness: 100 μm) manufactured by Sumitomo Bakelite Co., Ltd. in an ITO-deposition machine, to give a rear substrate 21.

The PES-ITO film of the rear substrate 21 is ultrasonicated in isopropyl alcohol for 2 minutes, washed with running water for 5 minutes, and then dried.

Then, a photosensitive film HW-450 manufactured by Hitachi Chemical Co., Ltd. is layered thereon at a roll pressure of 0.4 MPa, and UV-exposed through a mask pattern in the following shape by a V-exposing apparatus at 100 mJ/cm$^2$ for 90 seconds.

Then, the photosensitive film is developed with 1.0% aqueous sodium carbonate solution, washed with water, and dried to obtain partitioning members 33 (including gap members 28) in the following shape on the rear substrate 21.

The mask pattern used is a mask pattern in the shape of a 1-mm-pitch square lattice having a partitioning member width of 50 μm and an opening length of the partitioning member discontinuous regions of 50 μm, in which the position of discontinuous regions is located at the center of the intersection points of the partitioning members.

Figure 13A:
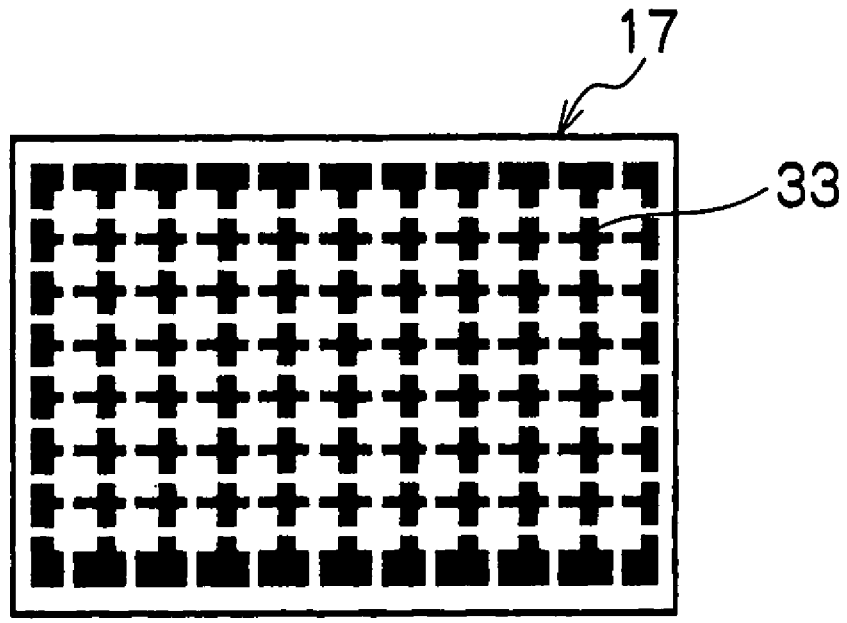
FIG. 13A is a schematic configuration view illustrating the display medium in the second embodiment, as seen from the display substrate side.
Figure 13B:
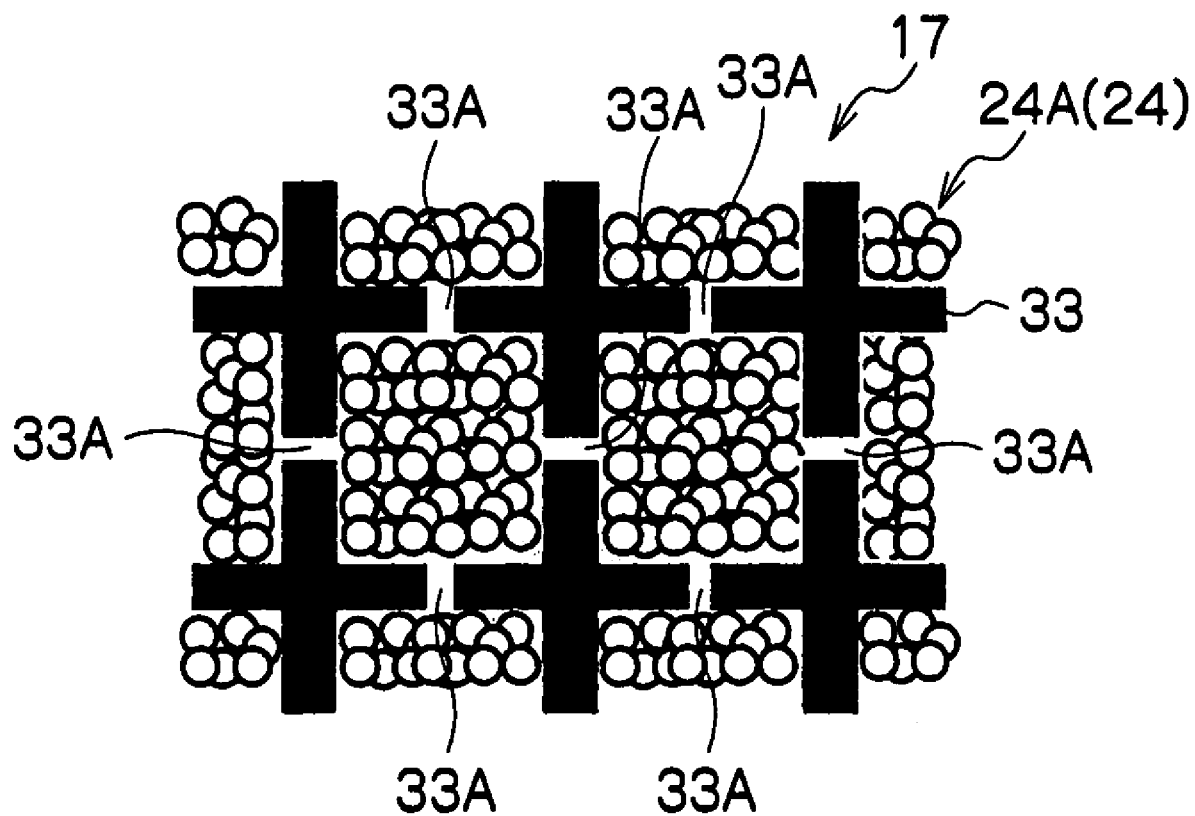
FIG. 13B is a schematic view illustrating the configuration of the display medium in the second embodiment as seen from the display substrate side.

The partitioning members 33 prepared (including gap members 28) have a height of 40 μm and a width of 30 μm, and square regions having 1 mm sides are formed as the specific regions partitioned in the planar surface direction of the rear substrate 21 along the planar surface direction of the rear substrate 21, as shown in FIGS. 13A and 13B. A discontinuous region 33A of 50 μm in size is formed at the center of each side (four sides) of the square having 1 mm sides that form each region. The partitioning members 33 having discontinuous regions 33A are prepared in this way, wherein the discontinuous regions 33A partition the surface of the rear substrate 21 into plural 1 mm×1 mm square regions along the planar surface direction, and adjacent partitioned regions have a connected region.

The white particles constituting the porous member 24A prepared above are filled in each of the partitioned square regions almost in the closest filling state, and the excess particles on the partitioning members 33 are removed with a roller.

Then, a display substrate 19 (in the same configuration with the rear substrate 21 prepared above) is placed thereon; the regions other than the injection ports for injecting a dispersion liquid of the prepared particle group 22 (15 parts by weight) dispersed in the dispersion medium 26 (85 parts by weight) is sealed with a UV-curable acrylic resin sealant and the regions other than the injection ports out of the contacting regions among the display substrate 19, partitioning members 33 and the gap members 28 are sealed by irradiation of ultraviolet ray by a UV-irradiating apparatus at 100 mJ/cm$^2$.

Then, the particles constituting the porous member 24A are filled also in the discontinuous regions 33A in partitioning members 33, as seen from the display substrate 19 side, and the device seemed uniformly white on the entire surface.

The display medium with the regions other than the injection ports are sealed is immersed in a container filled with a dispersion liquid containing the prepared particle group 22 (15 parts by weight) dispersed in the dispersion medium 26 (85 parts by weight), with its injection port facing downward. The display medium is deaerated in the state in a vacuum chamber at a vacuum decreased to 0.1 Torr and then brought back to atmospheric pressure, filling the display medium with the dispersion liquid.

The display medium is pulled-up from the dispersion liquid and dried for 10 minutes; the injection ports are cleaned and then sealed with an acrylic epoxy UV adhesive (3025 series) manufactured by Three Bond Co., Ltd., to give a display medium 17 shown in FIGS. 12 and 13.

The ITO electrodes of the display substrate 19 and the rear substrate 21 in the display medium 17 prepared in Example 1 above are connected respectively to a power source; a voltage is applied so that the potential difference is 15 V; and display is conducted by switching the direction of the electric field between the display substrate 19 side and the rear substrate 21 side; black color is displayed when the particle group 22 migrate to the display substrate 19 side, while white color is displayed when the particle group 22 migrate to the rear substrate 21 side.

When the display medium 17 is bent ten times repeatedly at a curvature radius of 30 mm both in a state in which the display medium 17 displays black and displays white respectively, there is no turbulence of display or blurred region generated before or after bending ten times. Observation of the bent region of the display medium 17, as expanded under an optical microscope, shows no damage on the partitioning member 33.

Example 2

A display medium 17 is prepared in the same manner as Example 1 except that the shape of the partitioning member 33 in Example 1 above is changed to the following shape according to the following method.

A thermosetting epoxy resin is coated by screen printing on the rear substrate 21 used in Example 1 so as to form the partitioning members 33 having a width of 30 μm and square regions having 1 mm sides as the specific regions partitioned in the planar surface direction of the rear substrate 21 along the planar surface direction of the rear substrate 21 and discontinuous regions 33A of 50 μm in size is formed at the center of each side (four sides) of the square having 1 mm sides that form each region as shown in FIG. 13B. The coated resin is heat-cured; and the same operation is repeated three times, until the height thereof reaches 40 μm.

The ITO electrodes of the display substrate 19 and the rear substrate 21 in the display medium 17 prepared in Example 2 above are connected respectively to a power source; a voltage is applied so that the potential difference is 15 V; and display is conducted by switching the direction of the electric field between the display substrate 19 side and the rear substrate 21 side; black color is displayed when the particle group 22 migrate to the display substrate 19 side, while white color is displayed when the particle group 22 migrate to the rear substrate 21 side.

When the display medium 17 is bent ten times repeatedly at a curvature radius of 30 mm both in a state in which the display medium 17 displays black and displays white respectively, there is no turbulence of display or blurred region generated before or after bending for ten times. Observation of the bent region of the display medium 17, as expanded under an optical microscope, shows no damage on the partitioning member 33.

Comparative Example 1

A display medium 17 is prepared in the same manner as in Example 1 except that the shape of the partitioning member 33 in Example 1 above is changed such that a discontinuous region 33A is not formed.

Specifically, the partitioning member 33 (including gap members 28) prepared in Comparative Example 1 has a height of 40 μm and a width of 30 μm, and has square regions having 1 mm sides along the planar surface direction of the rear substrate 21 as the specific partitioned regions in the planar surface direction of the rear substrate 21. Further, each side of the 1-mm square region has no discontinuous region and is continuous.

The ITO electrodes of the display substrate 19 and the rear substrate 21 in the display medium 17 prepared in Comparative Example 1 above are connected respectively to a power source; a voltage is applied so that the potential difference is 15 V; and display is conducted by switching the direction of the electric field between the display substrate 19 side and the rear substrate 21 side; black color is displayed when the particle group 22 migrate to the display substrate 19 side, while white color is displayed when the particle group 22 migrate to the rear substrate 21 side.

When the display medium 17 is bent ten times repeatedly at a curvature radius of 30 mm both in a state in which the display medium 17 displays black and displays white, respectively, with respect to a comparison of before and after bending ten times, areas of pale display color irregularly appear at the region bent, and the defective display does not return to its original display even when the display medium is left still. Observation of the region in which display irregularity occurs, as expanded under an optical microscope, shows that the partitioning members 33 are broken and display is not possible in the surrounding regions.

What is claimed is:

1. A display medium, comprising:
    first substrate and a second substrate, at least one of the first and second substrates having transparency;
    a particle group enclosed between the first and second substrates, the particle group migrating between the first and second substrates in response to an electric field formed between the pair of substrates;
    a dispersion medium that is enclosed between the first and second substrates and disperses the particle group;
    a porous member disposed between the first and second substrates and having a plurality of pores that allow passage of the particle group in a direction from a first substrate side to a second substrate side of the porous member, in a direction from the second substrate side to the first substrate side of the porous member, and in a direction perpendicular to a direction in which the first and second substrates are opposed; and
    embedded members that partition the porous member into specific regions and that are embedded inside at least a part of the pores in the porous member that are present along the direction in which the first and second substrates are opposed.

2. The display medium of claim 1, wherein the specific regions are regions of the porous member partitioned at a specified interval in a planar surface direction of the first and second substrates.

3. The display medium of claim 1, wherein the embedded members have discontinuous regions in a planar surface direction so that at least part of adjacent specific regions are connected to each other in the planar surface direction of the first and second substrates.

4. The display medium of claim 3, wherein the embedded members have the discontinuous regions at a specified interval in the planar surface direction.

5. The display medium of claim 1, wherein the embedded members are formed by fusing at least a part of the porous member.

6. The display medium of claim 1, wherein the embedded members are formed by filling the pores in the porous member with a filler.

7. The display medium of claim 1, wherein the porous member is the same color as the dispersion medium.

8. The display medium of claim 1, wherein the particle group has a voltage necessary for migration in response to electric field.

9. The display medium of claim 1, wherein the particle group is different in color from the porous member.

10. A display device, comprising:
    a display medium having a first substrate and a second substrates, at least one of the substrates having transparency, a particle group enclosed between the first and second substrates, the particle group migrating between the first and second substrates in response to an electric field formed between the first and second substrates, a dispersion medium that is enclosed between the first and second substrates and disperses the particle group, a porous member disposed between the first and second substrates and having a plurality of pores that allow passage of the particle group in a direction from the first substrate side to the second substrate side of the porous member, in a direction from the second substrate side to the first substrate side of the porous member, and in a direction perpendicular to a direction in which the first and second substrates are opposed, and embedded members that partition the porous member into specific regions that are embedded inside at least a part of the pores in the porous member that are present along the direction in which the first and second first and second substrates are opposed; and
    an electric field-forming unit for forming an electric field between the first and second substrates of the display medium.

11. A display medium, comprising:
    a first substrate and a second substrates, at least one of the substrates having transparency;
    a particle group enclosed between the first and second substrates, the particles migrating between the first and second substrates in response to an electric field formed between the first and second substrates;
    a dispersion medium that is positioned between the first and second substrates and disperses the particle group;
    a porous member disposed between the first and second substrates and having a plurality of pores that allow passage of the particle group in a direction from the first substrate side to the second substrate side of the porous member, in a direction from the second substrate side to the first substrate side of the porous member, and in a direction perpendicular to a direction in which the first and second substrates are opposed; and partitioning members that maintain a gap between the first and second substrates and partition the gap into specific regions between the first and second substrates, the specific regions having discontinuous regions in a planar surface direction of the first and second substrates so that at least a part of adjacent specific regions in the planar surface direction are connected to each other.

12. The display medium of claim 11, wherein the partitioning members have the discontinuous regions at a specified interval in the planar surface direction.

13. The display medium of claim 11, wherein the partitioning members are formed by fusing at least a part of the porous member.

14. The display medium of claim 11, wherein the partitioning members are formed by filling the pores in the porous member with a filler.

15. The display medium of claim 11, wherein the porous member is the same color as the dispersion medium.

16. The display medium of claim 11, wherein the particle group has a voltage necessary for migration in response to electric field.

17. The display medium of claim 11, wherein the particle group is different in color from the porous member.

18. A display device, comprising:

a display medium having a first substrate and second substrates, at least one of the substrates having transparency, a particle group enclosed between the first and second substrates, the particle group migrating between the first and second substrates in response to an electric field formed between the first and second substrates, a dispersion medium that is positioned between the first and second substrates and disperses the particle group, a porous member disposed between the first and second substrates and having a plurality of pores that allow passage of the particle group in a direction from the first substrate side to the second substrate side of the porous member, in a direction from the second substrate side to the first substrate side of the porous member, and in a direction perpendicular to a direction in which the first and second substrates are opposed, and partitioning members that partition a gap between the first and second substrates into specific regions and have discontinuous regions in a planar surface direction of the first and second substrates so that at least part of adjacent specific regions in the planar surface direction are connected to each other; and an electric field-forming unit for forming an electric field between the first and second substrates of the display medium.

* * * * *